US007866729B2

(12) United States Patent
Porat et al.

(10) Patent No.: US 7,866,729 B2
(45) Date of Patent: Jan. 11, 2011

(54) POWERED ACTUATING DEVICE FOR A CLOSURE PANEL OF A VEHICLE

(75) Inventors: Alex Porat, Aurora (CA); Salvatore Vitale, Munich (DE); Stephen A. G. Mitchell, Windsor (CA); Eduard Vasilescu, Newmarket (CA); Peter Lance Oxley, Mount Albert (CA); Gordon Andrew Paton, Sharon (CA); Jason David Niskanen, Keswick (CA); Andrew R. Daniels, Sharon (CA); Dragan Mrkovic, Newmarket (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 12/629,944

(22) Filed: Dec. 3, 2009

(65) Prior Publication Data

US 2010/0077666 A1 Apr. 1, 2010

Related U.S. Application Data

(63) Continuation of application No. 11/657,713, filed on Jan. 25, 2007, now Pat. No. 7,648,189, which is a continuation-in-part of application No. PCT/CA2005/001506, filed on Oct. 3, 2005.

(60) Provisional application No. 60/762,426, filed on Jan. 26, 2006, provisional application No. 60/818,989, filed on Jul. 6, 2006.

(51) Int. Cl.
*B60J 5/10* (2006.01)
*E05F 15/12* (2006.01)

(52) U.S. Cl. .................... 296/146.4; 296/146.8; 49/343

(58) Field of Classification Search .............. 296/146.4, 296/146.8, 56, 106; 49/344, 343, 341, 340, 49/339

See application file for complete search history.

(56) References Cited

U.S. PATENT DOCUMENTS 5,067,739 A 11/1991 Kuan (Continued)

FOREIGN PATENT DOCUMENTS

EP 1215412 B1 11/2004

(Continued)

*Primary Examiner*—Dennis H Pedder
*Assistant Examiner*—Melissa A Black
(74) *Attorney, Agent, or Firm*—Magna International Inc.

(57) ABSTRACT

An actuating device is provided for moving a closure panel between an open position spaced apart from a vehicle body and a closed position abutting the vehicle body to close an access opening thereof. The actuating device includes a telescopic arm having a first member coupled to one of the closure panel and the vehicle body and a second member coupled to the other of the closure panel and the vehicle body. The first and second members are slidable relative to one another to move the actuating device between a retracted position corresponding with the closed position and an extended position corresponding with the open position. A screw is rotatable relative to the first member. The screw includes a cavity formed therewithin. A nut is secured to the second member and threadingly engages the screw such that rotation of the screw moves the second member towards and away from the first member to move the actuating device between the respective retracted and extended positions. A gas spring is at least partially disposed within the cavity of the screw for urging the actuating device into the extended position to move the closure panel into the open position.

5 Claims, 9 Drawing Sheets

U.S. PATENT DOCUMENTS

| | | | | |
|---|---|---|---|---|
| 5,531,498 | A | 7/1996 | Kowall | |
| 5,944,376 | A | 8/1999 | Buchanan, Jr. | |
| 6,491,292 | B2 | 12/2002 | Stumm et al. | |
| 6,516,567 | B1 | 2/2003 | Stone et al. | |
| 6,707,173 | B2 | 3/2004 | Bauman et al. | |
| 6,755,458 | B1 | 6/2004 | Oberheide | |
| 6,772,652 | B2 | 8/2004 | Cronimus | |
| 6,799,790 | B2 | 10/2004 | Sakai et al. | |
| 7,377,075 | B2 * | 5/2008 | Oberheide | 49/139 |
| 2003/0146644 | A1 | 8/2003 | Sakai et al. | |
| 2004/0124662 | A1 | 7/2004 | Cleland et al. | |
| 2004/0237408 | A1 | 12/2004 | Stubbe | |
| 2006/0043763 | A1 | 3/2006 | Berklich, Jr. et al. | |
| 2006/0082188 | A1 | 4/2006 | Mitchell | |

FOREIGN PATENT DOCUMENTS

| | | | |
|---|---|---|---|
| EP | 1333207 | B1 | 8/2005 |
| EP | 1306512 | B1 | 1/2006 |

* cited by examiner

POWERED ACTUATING DEVICE FOR A CLOSURE PANEL OF A VEHICLE

CROSS-REFERENCE TO RELATED APPLICATIONS

This application is a Continuation of U.S. patent application Ser. No. 11/657,713 filed Jan. 1, 2007, now U.S. Pat. No. 7,648,189, which is a Continuation in part of International Application No. PCT/CA2005/001506 filed Oct. 3, 2005, and claims the benefit of and priority to U.S. Provisional Application Ser. Nos. 60/762,426, filed Jan. 26, 2006 and entitled "Dual Strut Assembly", and 60/818,989, filed Jul. 6, 2006 and entitled "Dual Inline Strut Assembly."

BACKGROUND OF THE INVENTION

1. Description of Related Art

The present invention relates to a powered actuating device for a closure panel of a vehicle, such as a hood or a rear lift gate for a trunk.

2. Background of the Invention

As is known, vehicles normally have a rear access opening to a luggage compartment, and a door assembly for closing the access opening.

More specifically, door assemblies are known, as described for example in U.S. Pat. No. 6,516,567, comprising a lift gate hinged to a fixed horizontal axis of the vehicle; one or more actuating devices interposed between the lift gate and a rear portion of the vehicle body distinct from said axis and delimiting the luggage compartment; and a motor for selectively controlling the actuating devices.

Known door assemblies can normally be set to a first and second operating configuration, in which the rear access opening of the vehicle is fully open and closed respectively.

More specifically, when the door assembly is in the fully-open configuration, the lift gate is detached from the rear portion of the vehicle body and fully raised with respect to its hinge axis so that the access opening is completely clear; and, in the closed configuration, the lift gate is lowered with respect to its hinge axis, and rests against the rear portion of the vehicle body defining the access opening to the luggage compartment, so that the access opening is fully closed.

Known door assembly actuating devices each comprise a telescopic arm and a gas spring, which are interposed between, and connected to separate parts of, the lift gate and the rear portion of the vehicle body, so as to extend side by side.

More specifically, the telescopic arm comprises a first and second member fixed to the rear portion of the vehicle body and to the lift gate respectively, and provides for moving the door assembly from one operating configuration to the other.

The first member of the telescopic arm is fitted with a screw connected functionally to the motor, and the second member is fitted with a nut screw integral with the lift gate and connected to the screw to permit slide of the second member with respect to the first member and extension/contraction of the telescopic arm.

The door assembly is moved from the closed to the open configuration by operating the motor in a first rotation direction.

The motor rotates the screw on the first member, so that the nut screw translates with respect to the screw in such a direction as to move the second member away from the first member and so extend the telescopic arm.

The lift gate, hinged to the fixed axis of the vehicle and connected to the second member of the telescopic arm, is therefore raised with respect to its hinge axis to move the door assembly into the fully-open configuration.

The door assembly is moved from the fully-open to the closed configuration in the same way, by operating the motor in a second rotation direction to contract the telescopic arm.

Contraction of the telescopic arm lowers the lift gate with respect to its hinge axis, so as to move the door assembly into the closed configuration.

The gas spring provides for maintaining equilibrium of the lift gate, when the motor is deactivated and the door assembly is in the fully-open configuration, by counteracting the weight of the lift gate.

Operation of the telescopic arm, in fact, requires that the screw and nut screw be connected reversibly, which means provision must be made to prevent the lift gate being lowered with respect to its hinge axis under its own weight when the motor is deactivated.

Known actuating devices require separate attachment points for the gas spring and the telescopic arm.

As a result, known devices are bulky, and limit access to the luggage compartment when loading large-size objects.

It is an object of the present invention to provide a powered actuating device for a closure panel of a vehicle, designed to eliminate the aforementioned drawback typically associated with known devices.

SUMMARY OF THE INVENTION

According to one aspect of the invention, an actuating device is provided for moving a closure panel between an open position spaced apart from a vehicle body and a closed position abutting the vehicle body to close an access opening thereof. The actuating device includes a telescopic arm having a first member coupled to one of the closure panel and the vehicle body, and a second member coupled to the other of the closure panel and the vehicle body. The first and second members are slidable relative to one another to move the actuating device between a retracted position corresponding with the closed position and an extended position corresponding with the open position. A screw is rotatable relative to the first member. The screw includes a cavity formed therewithin. A nut is secured to the second member and threadingly engages the screw such that rotation of the screw moves the second member towards and away from the first member to move the actuating device between the respective retracted and extended positions. A gas spring is at least partially disposed within the cavity of the screw for urging the actuating device into the extended position to move the closure panel into the open position.

According to another aspect of the invention, an actuating device is provided for moving a closure panel between an open position spaced apart from a vehicle body and a closed position abutting the vehicle body to close an access opening thereof. The actuating device includes a first member coupled to one of the vehicle body and the closure panel, and a second member coupled to the other of the vehicle body and closure panel. The first and second members are slidable relative to one another to move the actuating device between a retracted position corresponding to the closed position of the liftgate and an extended position corresponding to the open position of the liftgate. A screw is rotatable relative to the first member. A nut is secured to the second member and threadingly engages the screw such that rotation of the screw moves the second member towards and away from the first member to move the actuating device between the respective retracted and extended positions. A gas spring is disposed within the telescopic arm and spaced apart from the screw for urging the actuating device into the extended position to move the closure panel into the open position.

According to yet another aspect of the invention, an actuating device is provided for moving a closure panel between an open position spaced apart from a vehicle body and a closed position abutting the vehicle body to close an access opening thereof. The actuating device includes a first member coupled to one of the vehicle body and the closure panel, and a second member coupled to the other of the vehicle body and closure panel. The first and second members are slidable relative to one another to move the actuating device between a retracted position corresponding to the closed position of the liftgate and an extended position corresponding to the open position of the liftgate. A screw is rotatable relative to the first member. A nut is secured to the second member and threadingly engages the screw such that rotation of the screw moves the second member towards and away from the first member to move the actuating device between the respective retracted and extended positions. A gas spring is disposed within the telescopic arm and spaced apart from the screw for urging the actuating device into the extended position to move the closure panel into the open position. The gas spring and the screw are spaced apart and generally parallel to one another within the telescopic arm.

According to still another aspect of the invention, an actuating device is provided for moving a closure panel between an open position spaced apart from a vehicle body and a closed position abutting the vehicle body to close an access opening thereof. The actuating device includes a first member coupled to one of the vehicle body and the closure panel, and a second member coupled to the other of the vehicle body and closure panel. The first and second members are slidable relative to one another to move the actuating device between a retracted position corresponding to the closed position of the liftgate and an extended position corresponding to the open position of the liftgate. A gas spring is disposed within the telescopic arm for urging the actuating device into the extended position to move the closure panel into the open position. A rotatable screw is disposed within the telescopic arm. A nut threadingly engages the screw such that rotation of the screw moves the first and second members towards and away from one another to move the actuating device between the respective retracted and extended positions. One of the first and second members includes an annular space and an inner space separated by an inner cylindrical wall. The annual space slidably receives the gas spring and the inner space houses the rotatable screw.

BRIEF DESCRIPTION OF THE DRAWINGS

The present invention will be readily appreciated as the same becomes better understood by reference to the following detailed description when considered in connection with the accompanying drawings wherein.

DETAILED DESCRIPTION OF THE EMBODIMENTS

Figure 1:
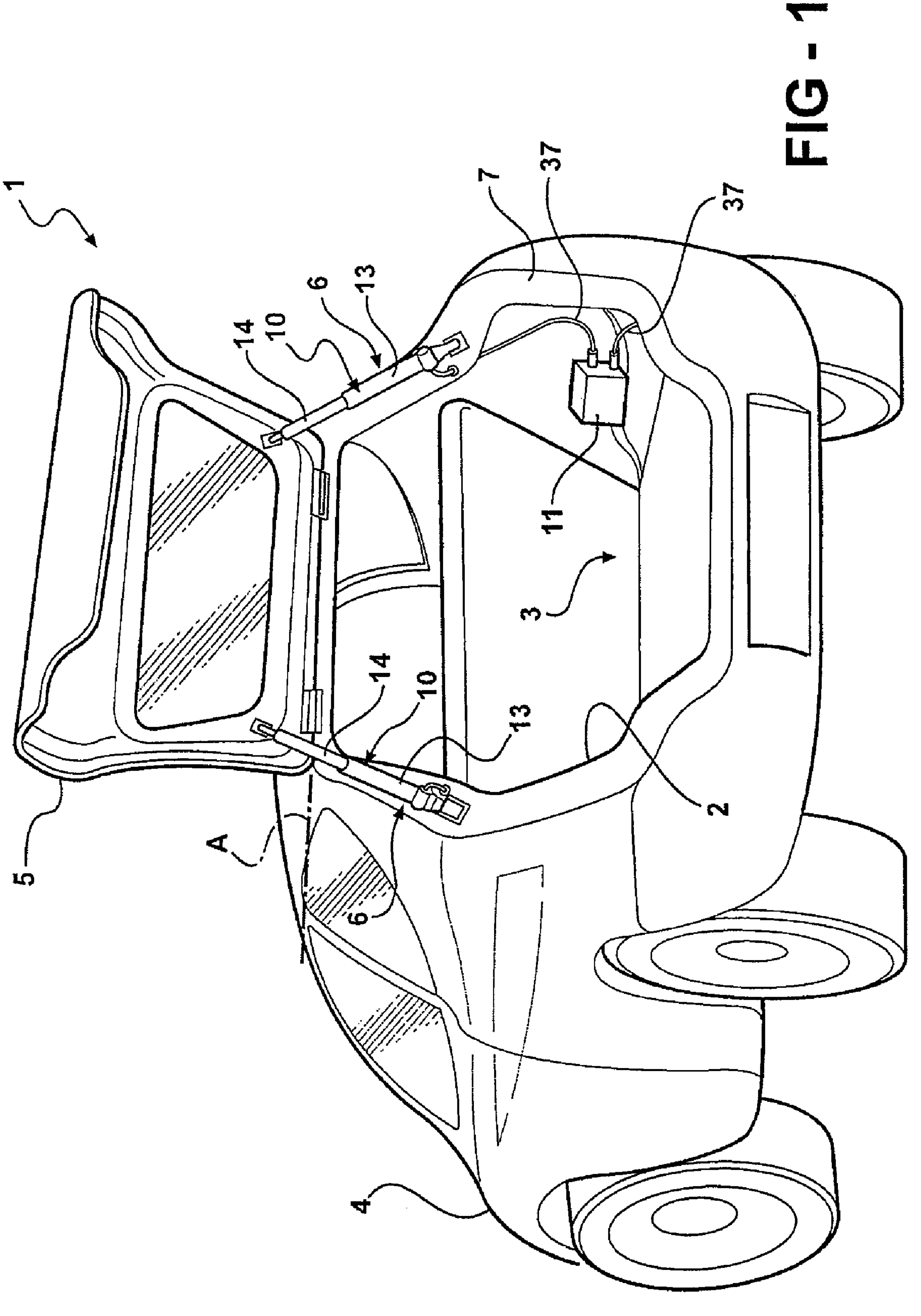
FIG. 1 is a rear perspective view of a vehicle including an actuating device according to a first embodiment of the invention.

Referring to FIG. 1, a door assembly, generally shown at 1, is provided for closing an access opening 2 to a rear luggage compartment 3 of a vehicle 4.

Assembly 1 can be set to two distinct operating configurations fully opening (FIG. 1) and fully closing access opening 2, and substantially comprises a liftgate 5 hinged about a horizontal axis A to one end 7 of the body of vehicle 4; one or more actuating devices 6—two in the example shown—interposed between the body of the vehicle 4 and liftgate 5 to move the liftgate 5 into the operating configurations; and a known motor 11 for selectively controlling actuating devices 6.

In the fully-open configuration (FIG. 1) of assembly 1, liftgate 5 is detached from end 7 and raised with respect to axis A, so that access opening 2 is completely clear; and, in the fully-closed configuration (not shown) of assembly 1, liftgate 5 is lowered with respect to axis A and rests against end 7, so that access opening 2 is closed completely.

Each actuating device 6 includes a telescopic arm, generally indicated at 10, powered by motor 11 to move liftgate 5 into the operating configurations of assembly 1; and a gas spring 12 for maintaining equilibrium of liftgate 5 in the open configuration.

Figures 2, 3:
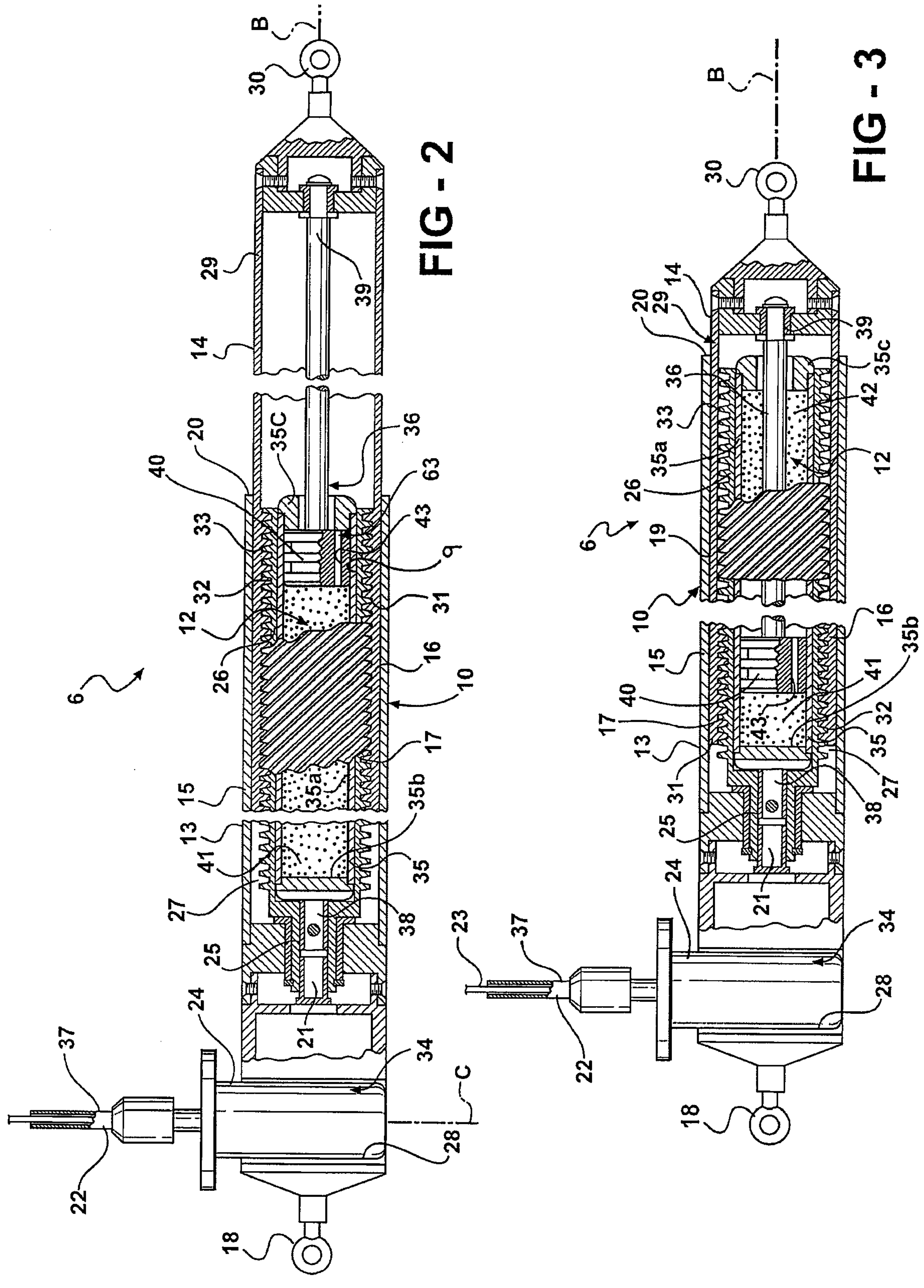
FIG. 2 is an enlarged axial section of the actuating device in an extended position corresponding to a fully open configuration of a door assembly.
FIG. 3 is an enlarged axial section of the actuating device in a retracted position corresponding to a closed configuration of the door assembly.

With particular reference to FIGS. 2 and 3, each telescopic arm 10 has an axis. B, and comprises two hollow members 13, 14 connected in axially-sliding manner to each other, and coupled with end 7 of the body of vehicle 4 and with liftgate 5.

More specifically, member 14 is located radially inwards of member 13, and is slidable axially with respect to member 13 to vary the length of telescopic arm 10, as described in detail later on.

Member 13 includes a hollow, substantially cylindrical casing 15 fixed to end 7 of the body of vehicle 4; and a screw 17 powered by motor 11, as described in detail later on, housed inside casing 15, and engaging a nut screw 16 formed on member 14.

More specifically, casing 15 has a closed first axial end 18 coupled to end 7 of the body of vehicle 4; and a cylindrical tubular portion 19 housing screw 17 and defining an open axial end 20, opposite end 18, for connection to member 14.

Screw 17 comprises a substantially cylindrical stem 26 housed loosely inside tubular portion 19 of casing 15, and having a threaded outer surface 33 engaging nut or nut screw 16; and a smaller-diameter end portion 25, which is supported in axially fixed and rotary manner by an inner annular rib of tubular portion 19, and is driven by motor 11 as described in detail later on.

More specifically, stem 26 of screw 17 and tubular portion 19 of casing 15 define between them an annular-section cylindrical seat 27 for receiving member 14.

Member 14 is defined by a hollow, substantially cylindrical casing 29 comprising a closed first end 30 coupled to liftgate 5, and an open second end 31, opposite end 30, having a radially inner, threaded surface 32.

More specifically, end 31 of member 14 engages seat 27, and is interposed between tubular portion 19 of casing 15 and stem 26 of screw 17, so that threaded surfaces 32 and 33 engage mutually.

The threads of threaded surfaces 32 and 33 are shaped and proportioned in known manner to permit reversible relative motion between stem 26 of screw 17 and end 31 of member 14.

According to an important aspect of the present invention, gas spring 12 is housed inside telescopic arm 10 and connected to members 13 and 14.

Advantageously, screw 17 defines an axial through cavity 9, and spring 12 comprises a cylinder or jacket 35 containing gas, formed or fitted within the cavity 9 of the stem 26 of the screw 17, and fixed to screw 17; and a plunger or piston rod 36 sliding in fluidtight manner inside jacket 35 and connected to casing 29 of member 14.

More specifically, jacket 35 comprises a cylindrical tubular wall 35*a*; and opposite ends 35*b*, 35*c*, from one of which (35*b*), facing end 18, a pin 38 projects axially and is connected prismatically to end portion 25 to connect screw 17 and jacket 35 angularly integral with each other. In an alternate embodiment, the screw 17 could rotate around the gas spring 12 by various means including, but not limited to, a sleeve bearing.

Plunger 36 comprises a piston 40 sliding in fluidtight manner along the inner wall of jacket 35; and a smaller-diameter piston rod 39 projecting from piston 40, extending in fluidtight manner through end 35*c*, and having one end, opposite piston 40, connected to casing 29, close to end 30.

Piston 40 divides jacket 35 into two separate chambers 41, 42, each bounded by piston 40 and a relative end 35*b*, 35*c*; and piston 40 has at least one hole 43 permitting two-way gas flow between chambers 41, 42.

Motor 11 and each device 6 are connected functionally by means of a transmission 34 comprising a flexible connecting member, e.g. a flexible Bowden cable, and a known reducer 24 not shown in detail.

In one embodiment, reducer 24 is housed at least partly inside casing 15 of member 13, and has an input shaft (not shown) connected by flexible cable 37 to motor 11, and an output shaft 21 connected to screw 17.

More specifically, reducer 24 is housed inside a cylindrical seat 28 having an axis C perpendicular to axis B and formed inside casing 15, close to end 18; and output shaft 21 extends coaxially with axis B and is fitted prismatically inside end portion 25 of screw 17.

Flexible cable 37 comprises a sheath 22 fixed at opposite ends to the fixed external parts of motor 11 and reducer 24 respectively; and a core 23 rotatable inside sheath 22 and connected functionally to an output member (not shown) of motor 11 and to the input shaft of reducer 24.

In actual use, on the basis of a user command, assembly 1 is moved selectively by actuating devices 6 between the closed and fully-open operating configurations and vice versa.

The fully-open configuration of assembly 1 (FIGS. 1 and 2) corresponds to a maximum length of arm 10 produced by maximum axial projection of member 14 with respect to member 13; and the closed configuration (FIG. 3) of assembly 1 corresponds to a minimum length of arm 10 and therefore minimum axial projection of member 14 with respect to member 13.

More specifically, as of the closed configuration (FIG. 3), motor 11, on receiving an appropriate control signal, is rotated in a first direction, and in turn rotates screws 17 of respective devices 6 about respective axes B by means of flexible cables 37 and reducers 24.

Rotation of each screw 17 translates casing 29 of member 14 along axis B by means of the connection between threaded surfaces 33 and 32.

Translation of casing 29 moves end 30, integral with liftgate 5, away from end 18 of casing 15 connected to end 7 of the body of vehicle 4.

As a result, member 14 slides inside member 13 to increase the free length of telescopic arm 10 and the extension of the portion of member 13 projecting from member 14.

Consequently, liftgate 5, hinged about axis A to end 7 of the body of vehicle 4 and connected to member 14, is raised with respect to axis A.

At the same time, jacket 35 of spring 12 is rotated integrally with screw 17 by means of the prismatic connection between end portion 25 and pin 38.

As member 14 slides inside member 13, piston 40, connected to casing 29 of member 14, slides axially inside jacket 35, connected to member 13, towards end 30 to extend spring 12.

At this stage, gas flows from chamber 42 to chamber 41 through hole 43 in piston 40 until a condition of equilibrium is established.

On reaching the maximum length of telescopic arm 10 and maximum projection of member 14 from member 13, assembly 1 assumes the fully-open configuration, lift gate 5 is raised completely with respect to axis A, and motor 11 is deactivated.

In this condition, spring 12 maintains lift gate 5 in equilibrium, to prevent the weight of the lift gate 5 from translating casing 29 and so rotating screw 17.

Assembly 1 is moved from the fully-open to the closed configuration in exactly the same way as described above, except that motor 11 is rotated, by means of an appropriate control signal, in a second direction opposite the first, and, at the end of the operation, spring 12 assumes a shortened configuration produced by gas flowing from chamber 41 to chamber 42 through hole 43 in piston 40.

Given the reversibility of the connection between threaded surfaces 32 and 33 of nut screw 16 and screw 17, assembly 1 can also be set to the closed or open configuration without operating motor 11, and by simply acting manually on lift gate 5 to position it resting against or detached from end 7 of the body of vehicle 4 respectively. For which purpose, a known clutch (not shown) is conveniently interposed between motor 11 and transmission 34.

The advantages of actuating devices 6 according to the present invention will be clear from the foregoing description.

In particular, devices 6 provide for both moving and sustaining lift gate 5 in the open position, while only occupying the same overall space as known telescopic arms.

Moreover, devices 6 do not require separate attachment points for springs 12 and telescopic arms 10, thus simplifying use of access opening 2 to luggage compartment 3 and assembly of devices 6 themselves. More specifically, on-vehicle integration cost of gas springs 12 and telescopic arms 10 is much cheaper as compared with that of known devices.

Clearly, changes may be made to actuating devices 6 as described and illustrated herein without, however, departing from the protective scope defined in the accompanying Claims.

In particular, spring 12 may employ air or other types of fluid, or may be replaced by any other type of elastic means, i.e. capable of an elastic variation in length.

Moreover, reducer 24 may be housed inside casing 15 of member 13 and extend coaxially with axis B.

Finally, actuating devices 6 as described and claimed herein may be advantageously used on vehicle closure panels of different type, such as hoods.

Referring to FIGS. 4 through 10, wherein like primed reference numerals represent similar elements as those set forth above, the actuating device 6' in a second embodiment of the invention includes the telescopic arm 10' having the member 13' coupled to the closure panel or liftgate 5' and the member 14' coupled to the end 7' of the body of the vehicle 4'. It is, however, appreciated that the member 13' could be coupled to the end 7' of the body of the vehicle 4' and the member 14' could be coupled to the closure panel or liftgate 5'. The member 13' is in slidable, telescopic engagement around the member 14'. The members 13', 14' are formed aluminum tubes and each member 13' 14' is supported by bushings 45. The actuating device 6' is movable between a retracted position, shown in FIG. 4, in which the member 13' covers a majority of the member 14' and an extended position, shown in FIG. 5, in which the member 14' slides relative to the member 13' such that a substantial portion of the member 14' is exposed.

Figures 4, 5:
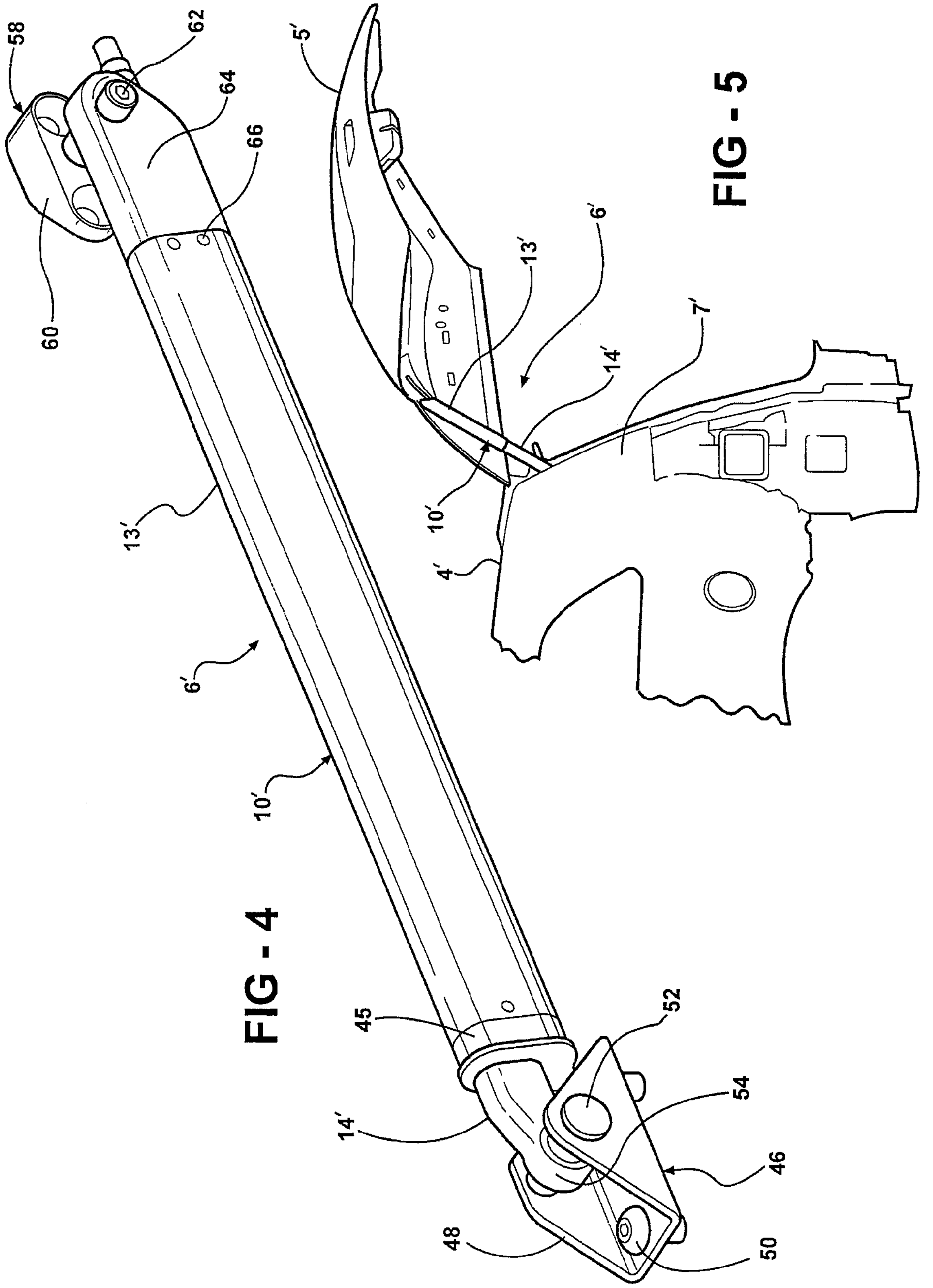
FIG. 4 is a perspective view of an actuating device according to a second embodiment of the invention in a retracted position with a first member covering a majority of a second member.
FIG. 5 is a fragmentary perspective view of a vehicle including the actuating device of the second embodiment in an extended position.
Figures 6, 7:
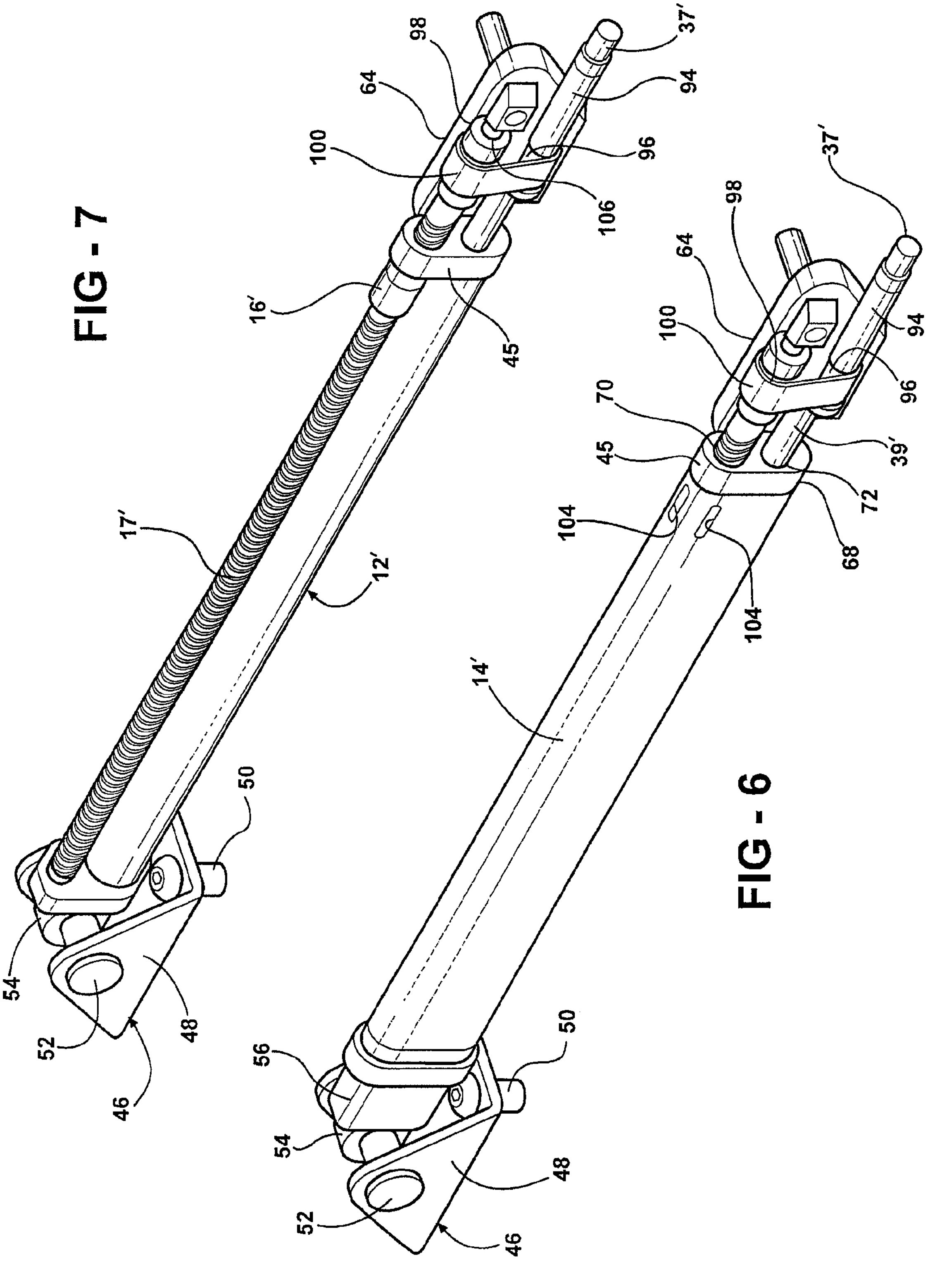
FIG. 6 is a perspective view, partially cut away, of the actuating device of the second embodiment.
FIG. 7 is a perspective view, partially cut away, of the actuating device of the second embodiment.

Referring to FIGS. 4, 6, and 7, the actuating device 6' includes a first pivot mount, generally indicated at 46, disposed at one end of the member 14' and coupled to the vehicle body. The first pivot mount 46 includes a base plate 48 fixedly mounted to the end 7' via fasteners 50. An axle 52 extends through apertures formed in the base plate 48 and through a distal end 54 of the member 14' to allow pivotal movement of the actuating device 6' about the first pivot mount 46. The first pivot mount 46 further includes a base cap 56 to seal off the member 14' adjacent the end 7' of the vehicle 4'.

The actuating device 6' also includes a second pivot mount, generally indicated at 58, disposed at one end of the member 13' and coupled to the liftgate 5'. The second pivot mount 58 provides a two degree of freedom joint, thereby constraining motion of the actuating device 6' throughout travel of the liftgate 5' between a closed position (corresponding to the fully closed configuration of the assembly 1') and an open position (corresponding to the fully open configuration of the assembly 1').

The second pivot mount 58 includes a base plate 60 fixedly mounted to the liftgate 5'. An axle 62 extends through apertures formed in the base plate 60 to allow pivotal movement of the actuating device 6' about the second pivot mount 58. The second pivot mount 58 also includes a pivot cap 64 fixedly mounted to the end of the member 13' via a plurality of fasteners 66.

Referring to FIGS. 6 and 7, the member 14' includes a curved sidewall 68 defining first 70 and second 72 cylindrical enclosures. The first 70 and second 72 enclosures are arranged in a parallel orientation. In the illustrated embodiment, the diameter of the second enclosure 72 is greater than the diameter of the first enclosure 70. It is, however, appreciated that the relative diameters of the first 70 and second 72 enclosures may vary.

Figure 8:
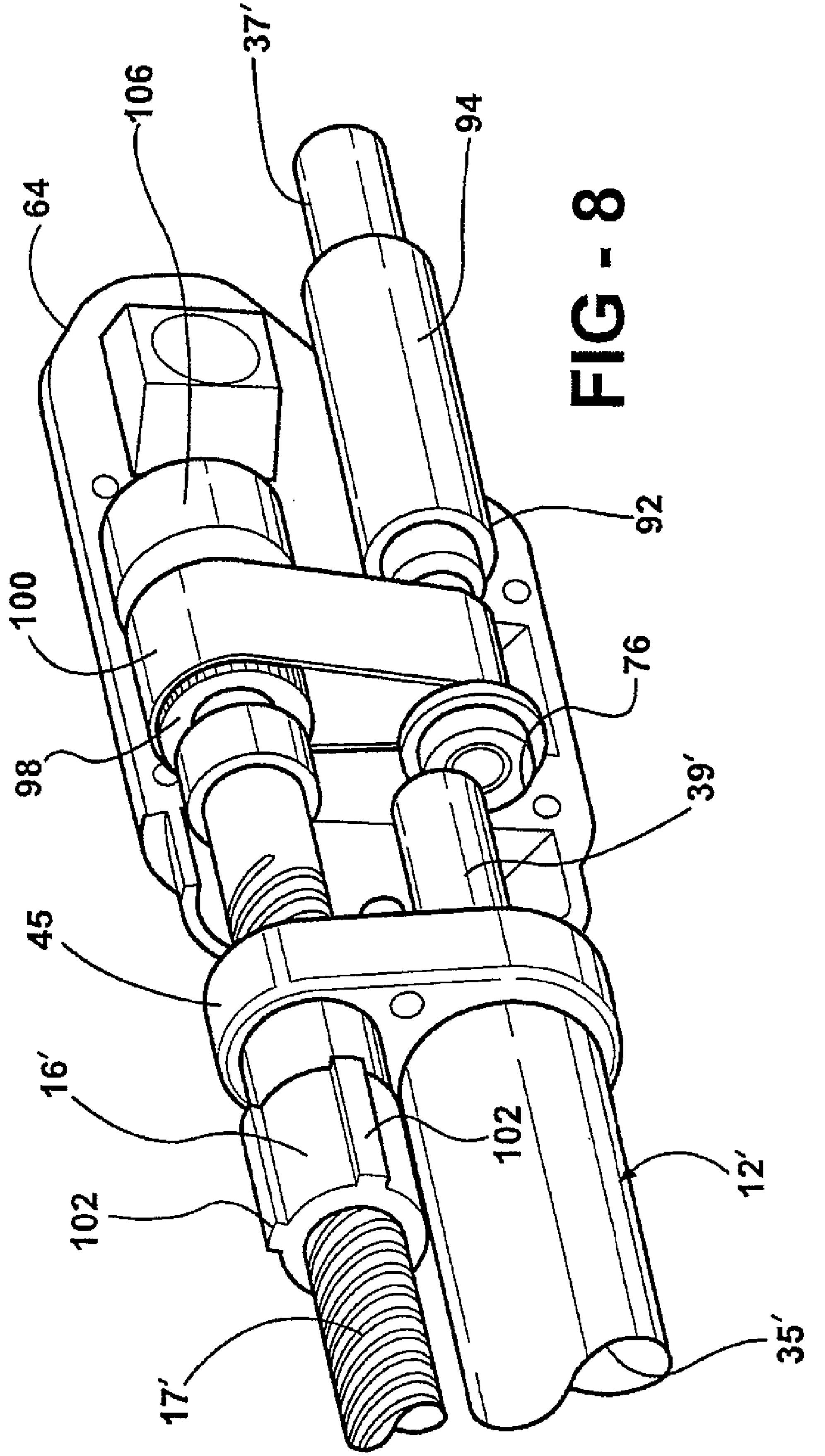
FIG. 8 is a fragmentary perspective view of the actuating device with one end of a screw operably coupled to a cable.

Referring to FIGS. 6 through 8, the gas spring 12' is disposed within the second enclosure 72 of the member 14' to provide a force opposing the weight of the liftgate 5' at various points of travel between the open and closed positions. The gas spring 12' includes the cylinder or jacket 35' and the piston rod 39'. The cylinder 35' is a pneumatic cylinder. One end of the cylinder 35' abuts against a niche (not shown) in the base cap 56 at the first pivot mount 46 to provide a reactive force to the liftgate 5'. An end of the piston rod 39' abuts against a niche 76 in the pivot cap 64 at the second pivot mount 58.

When the actuating device 6' is in the retracted position, the piston rod 39' is located primarily within the cylinder 35'. And when the actuating device 6' is in the extended position, the piston rod 39' extends substantially outside of the cylinder 35'. The gas spring 12' continuously urges the actuating device 6' into the extended position. Therefore, the gas spring 12' assists movement of the liftgate 5' into the open position and dampens movement of the liftgate 5' into the closed position.

The screw 17' is disposed within the first enclosure 70'. The screw 17' and the gas spring 12' operate in tandem to raise the liftgate 5' from the closed position to the open position. The screw 17' is powered by a motor assembly 78, shown in FIG. 9, which is located within the sheet metal of the liftgate 5'. The location of the motor assembly 78 away from the actuating device 6' allows the size and weight of the actuating device 6' to be reduced. The screw 17' is operably connected to the motor assembly 78 by the cable 37'.

Figure 9:
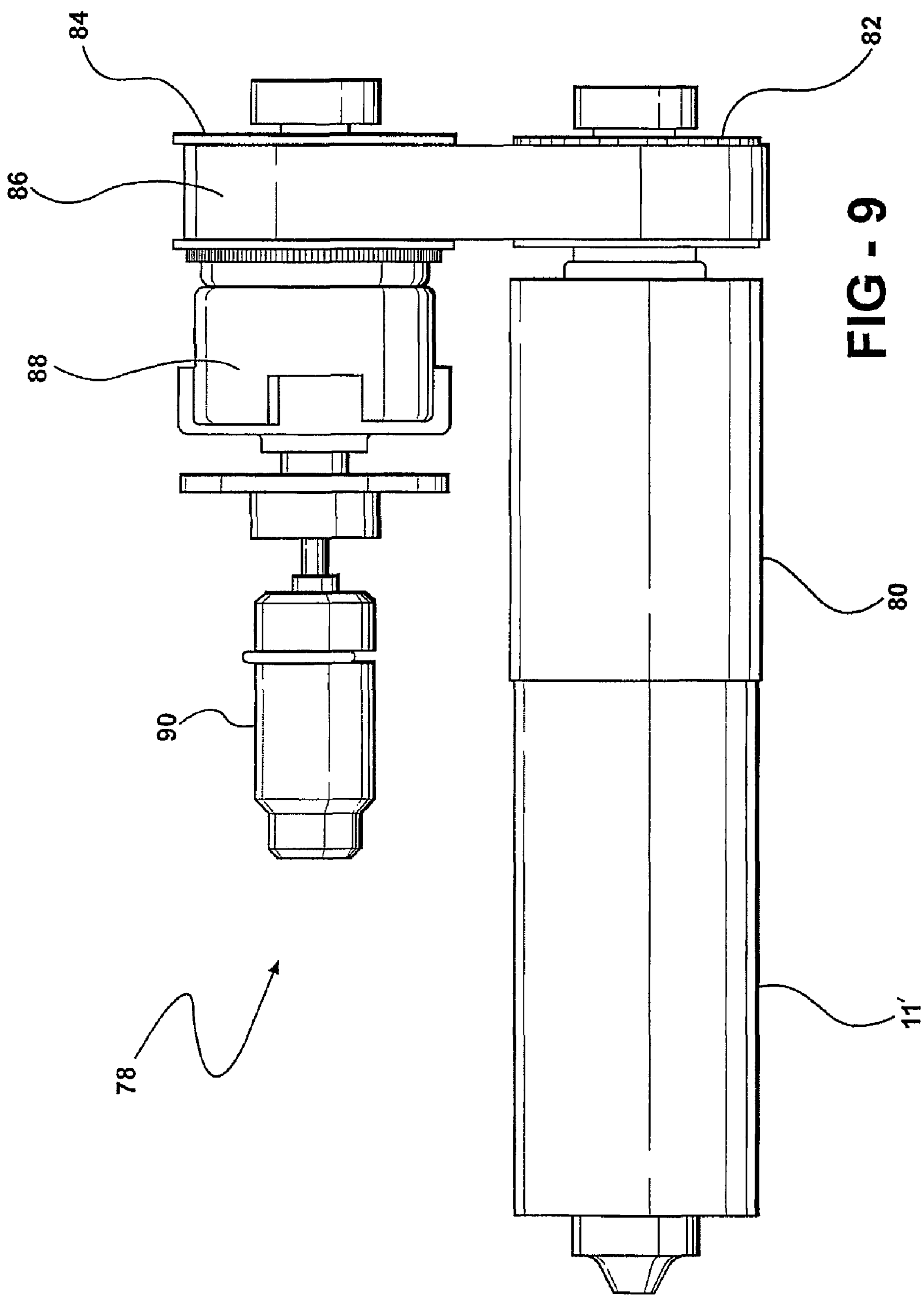
FIG. 9 is a top view of a motor assembly for the actuating device.

Referring to FIG. 9, the motor assembly 78 includes the reversible motor 11'. Thus, if the liftgate 5' encounters an obstacle during powered operation, the direction of motion of the liftgate 5' can be changed by simply reversing the motor 11'. Through an inline planetary gearbox 80, the motor 11' drives a first pulley 82, which in turn drives a second pulley 84 via a belt 86. The belt 86 transmits force and assists in the reduction of noise within the motor assembly 78. A clutch assembly 88 interconnects the second pulley 84 and the cable 37' via a flex cable ferule 90. Upon activation of the motor 11', the gearbox 80 rotates the cable 37' in order to rotate the screw 17'. When the motor 11' is disengaged, the clutch assembly 88 decouples the cable 37' from the motor assembly 78 in order to minimize back drive for manual, that is non-powered, raising or lowering of the liftgate 5'.

Referring back to FIGS. 6 through 8, the cable 37' enters the pivot cap 64 through an aperture 92 formed in the second pivot mount 58 in order to further reduce the packaging size of the actuating device 6'. A substantially rigid bushing 94 is disposed within the aperture 92 to provide a weather-tight seal for the cable 37'. The bushing 94 also minimizes bending of the cable 37' proximate the pivot cap 64, which in turn reduces operating noise. The cable 37' terminates at a first pulley 96 disposed within the pivot cap 64. A second pulley 98 is disposed within the pivot cap 64 spaced apart from the first pulley 96. The second pulley 98 is coupled to one end of the screw 17'. A belt 100 wraps around the first 96 and second 98 pulleys to operably connect the first pulley 96 to the second pulley 98. Thus, rotation of the cable 37' causes the second pulley 98 to rotate, which in turn rotates the screw 17'.

The nut 16' is fixedly secured to the member 14' and is complementarily threaded to the screw 17'. More specifically, the nut 16' is locked into place and prevented from rotating relative to the member 14' via at least one key fin 102 that fits into at least one slot 104 formed along the member 14'. Activation of the motor 11' causes the screw 17' to rotate, which in turn drives the nut 16' linearly along the screw 17' to force the members 13', 14' towards one another (to move the actuating device 6' to the retracted position) or away from one another (to move the actuating device 6' to the extended position).

In operation, starting with the liftgate 5' in the closed position and the actuating device 6' in the retracted position, actuation of the motor 11' causes the screw 17' to rotate in a first direction. As a result, the nut 16' is driven linearly to force the members 13', 14' apart from one another so that the actuating device 6' moves into the extended position. The movement of the actuating device 6' to the extended position raises the liftgate 5' into the open position. When the liftgate 5' is being raised to the open position, the lifting force is provided by the gas spring 12' and the screw 17' and nut 16'. The force provided by the gas spring 12' and the screw 17' and nut 16' remains parallel within the actuating device 6' regardless of the pivot angle of the actuating device 6' throughout motion of the liftgate 5' between the open and closed positions.

To return the liftgate 5' to the closed position, the motor 11' is actuated in a reverse direction in order to rotate the screw 17' in an opposing second direction. As a result, the nut 16' is driven linearly to force the members 13', 14' towards one another so that the actuating device 6' moves into the retracted position. Thrust forces are handled by double row angular contact bearings 106 located within the members 13', 14'. The movement of the actuating device 6' to the retracted position lowers the liftgate 5' into the closed position.

It will be apparent to those of skill in the art that modifications can be made to the actuating device 6' without departing from the scope of the invention. For example, the motor assembly 78 could be located within the actuating device 6', within the pivot cap 64 to reduce packaging space, or within the vehicle 4' for connection to the screw 17' via a flex cable passing through the member 13'. Alternatively, the actuating device 6' could be adapted to raise or lower a closure panel other than the liftgate 5', such as a tailgate or deck lid/trunk. Other alterations will occur to those of skill in the art.

Figure 10:
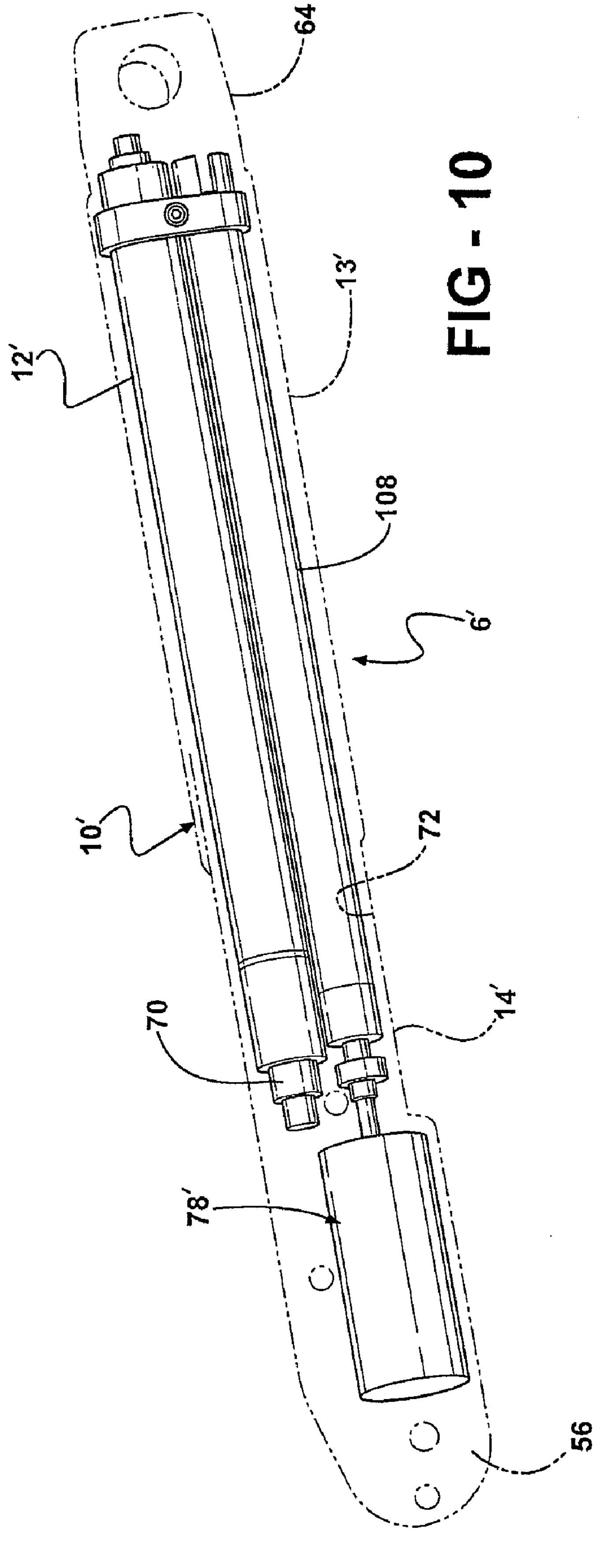
FIG. 10 is a perspective view of an alternate variation of the actuating device.

Referring to FIG. 10, an alternative embodiment of the actuating device 6' includes the members 13', 14', the base cap 56, and the pivot cap 64. In this embodiment, a ball screw 108 replaces the screw 17', and the motor assembly 78 is retained within the base cap 56 and connected to a power supply (not shown) for the vehicle 4'. The ball screw 108 has ball bearings between the threads of the screw 17' and the nut 16', resulting in a low friction drive. The threads may also have a low pitch, so that a low torque can provide a high force output. Since the torque needed by the ball screw 108 is low, there is no need for a gearbox between the ball screw 108 and the motor assembly 78 and the motor 11' is directly connected to the ball screw 108. The low pitch of the ball screw 108 provides also the advantage of a low torque to backdrive, thus removing the need for a clutch for manual operation of the liftgate 5'. Moreover, by eliminating the gearbox, operation of the actuating device 6' may be quieter. By placing the motor assembly 78 within the base cap 56, the number of parts required decreases, reducing size and complexity. Additionally, the need for a flex shaft is removed, thus increasing the durability of the actuating device 6'.

Figure 11:
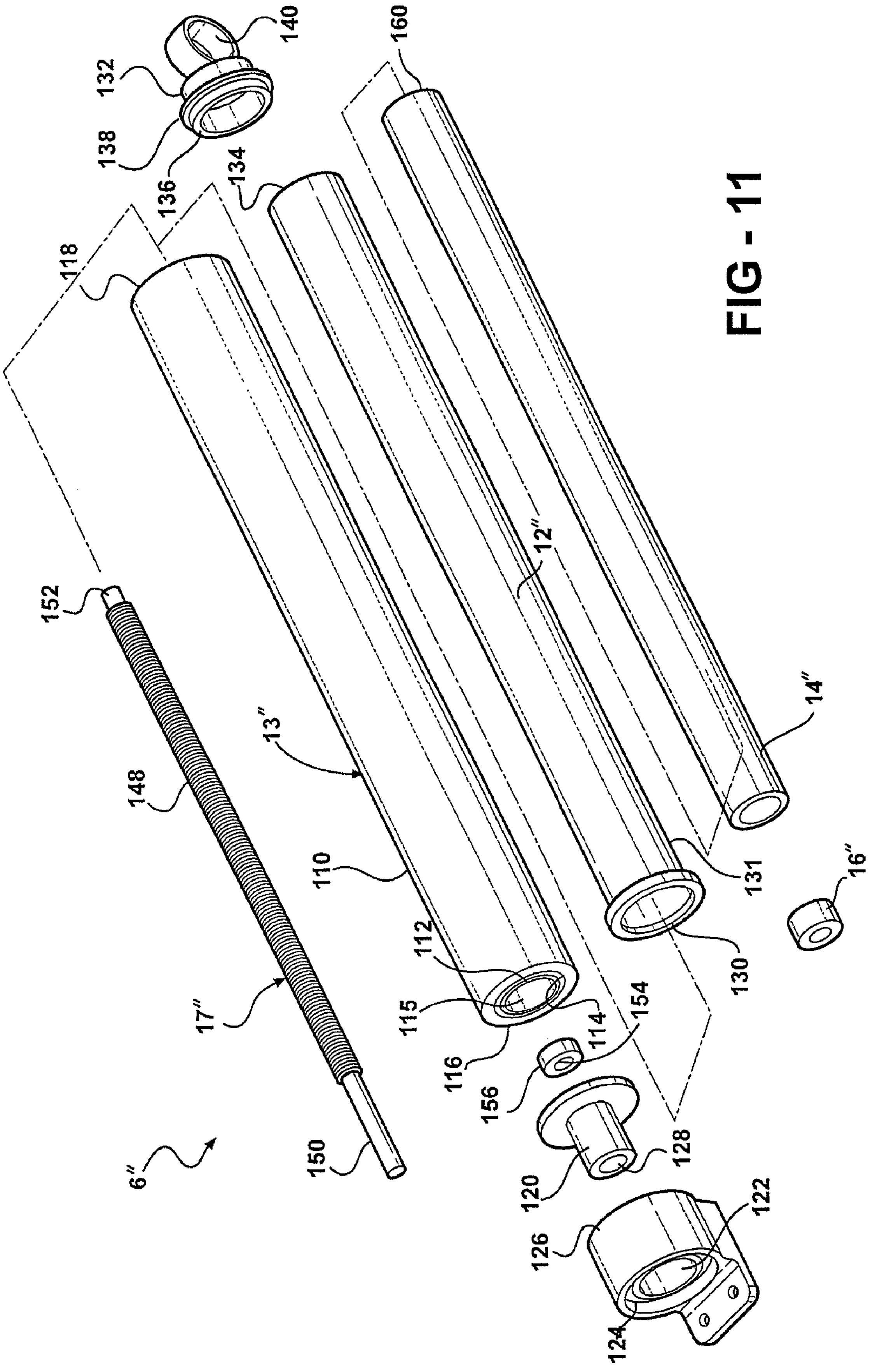
FIG. 11 is an exploded perspective view of an actuating device according to a third embodiment of the invention.
Figure 12:
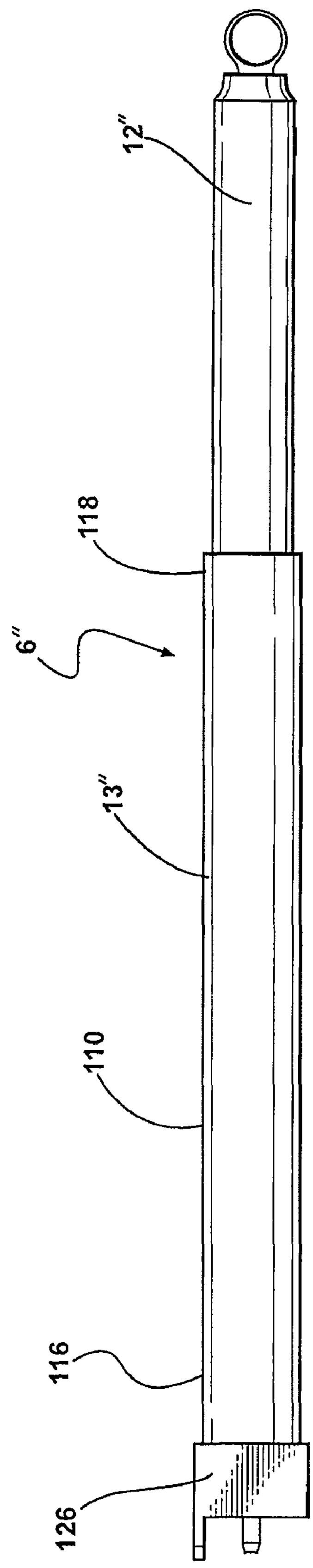
FIG. 12 is a side view of the actuating device.
Figure 13:
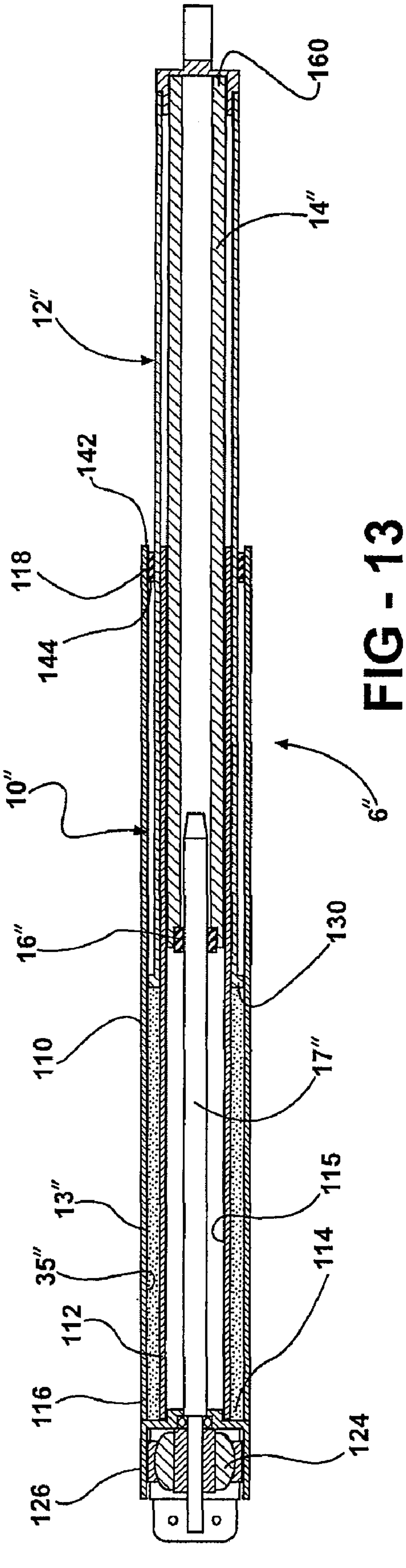
FIG. 13 is a sectional view of the actuating device.

Referring to FIGS. 11 through 13, wherein double-primed reference numerals represent similar elements as those set forth above, the actuating device 6" in a third embodiment of the invention includes the telescopic arm 10" having the hollow cylindrical members, generally indicated at 13", 14". The member 13" extends between opposing ends 116, 118 and includes an outer cylindrical wall 110 and an inner cylindrical wall 112 arranged in a concentric relationship. The outer 110 and inner 112 cylindrical walls define an annular space 114 therebetween. The inner cylindrical wall 112 defines an inner space 115 for receiving the member 14" and the screw 17".

An end cap 120 is mounted against the outer 110 and inner 112 cylindrical walls to seal off the annular space 114 at the end 116 of the member 13". The end cap 120 maintains the concentric relationship between the outer 110 and inner 112 cylindrical walls. The end cap 120 is mounted within an aperture seat 122 of a spherical ball joint 124. The spherical ball joint 124 is rotatably housed within a support structure 126 that is mounted to the end 7" of the body of the vehicle 4". The end cap 120 includes a bore 128.

The outer 110 and inner 112 cylindrical walls form the jacket or cylinder 35" within the annular space 114 for containing the fluid of the gas spring 12". The gas spring 12" includes a piston provided by a plunger flange 130 at one end 131, which slides within the jacket 35" against the outer 110 and inner 112 cylindrical walls in a fluid-tight manner. The gas spring 12" also includes the piston rod 39" extending out from the plunger flange 130.

A gas spring cylinder cap 132 is provided to seal off an opposing end 134 of the gas spring 12". The gas spring cylinder cap 132 includes a cylindrical wall portion 136 fitted to provide a snug engagement against an inner surface of the gas spring 12". The gas spring cylinder cap 132 also includes a flange 138 abutting against a sidewall of the gas spring 12". The gas spring cylinder cap 132 further includes a joint 140 (typically a two degree of freedom joint) for mounting to a complementary structure on the liftgate 5". The joint 140 works in tandem with the spherical ball joint 124 to constrain motion of the actuating device 6" during movement of the liftgate 5" between the open and closed positions.

A flange 142, shown in FIG. 13, is provided along the end 118 of the outer cylindrical wall 110 and extends radially inwards to abut against the gas spring 12". The flange 142 also closes off one end of the annular space 114. A seal 144 is provided adjacent the end 118 of the outer cylindrical wall 110 to provide a fluid-tight seal between the gas spring 12" and the outer cylindrical wall 110.

The screw 17" of the actuating device 6" is rotatably mounted along a central axis of the actuating device 6" and extends through the inner space 115 defined by the inner cylindrical wall 112. The screw 17" includes a threaded portion 148, and first 150 and second 152 non-threaded portions. The first non-threaded portion 150 is seated through a bore 154 of a bearing 156. The bearing 156 is located within the end cap 120. The first non-threaded portion 150 of the screw 17" further extends through the bore 128 of the end cap 120.

The screw 17" is kinematically connected to and driven by the motor assembly (not shown), which may be mounted to the actuating device 6" proximate the support structure 126. Alternatively, the screw 17" may be driven by the flex cable attached to the motor (not shown) remotely located on the body of the vehicle 4".

The nut 16" is seated along the threaded portion 148 of the screw 17". The nut 16" is secured to the member 14". The rotation of the screw 17" will move the member 14" linearly along the screw 17". One end 160 of the member 14" is coupled to the gas spring cylinder cap 132. As a result, the gas spring 12" and the member 14" are both connected to the gas spring cylinder cap 132. The nut 16" may have a ball nut configuration, which provides a low friction drive. The complementary threads of the screw 17" and nut 16" may have a low pitch so that a low torque can provide a high force output. Since the torque needed by the actuating device 6" is low, there is no need for a gearbox between the screw 17" and the motor (not shown). Therefore, the motor can be connected directly to the screw 17". Additionally, the low pitch of the threads allows the member 14" to be retracted without a clutch, thereby allowing a manual closure of the liftgate 5".

In operation, starting with the actuating device 6" in the retracted position and the liftgate 5" in the closed position, actuation of the motor 11" causes the screw 17" to rotate in a first direction. The rotation of the screw 17" linearly translates the member 14" along the central axis of the actuating device 6" and out of the member 13" to move the actuating device 6" to the extended position. The member 14" and the gas spring 12" are both secured to the gas spring cylinder cap 132. Thus, the gas spring 12" also slides outwards of the member 13". The gas spring 12" continuously urges the actuating device 6" into the extended position in order to assist the screw 17" and nut 16" in moving the liftgate 5" to the open position.

To return the liftgate 5" to the closed position, the motor 11" is actuated to rotate the screw 17" in an opposing second direction. The rotation of the screw 17" linearly translates the member 14" along the central axis of the actuating device 6" and into the member 13" to move the actuating device 6" to the retracted position. The gas spring 12" also retracts with the member 14". The gas spring 12" provides a dampening effect when the liftgate 5" is moved into the closed position. During powered operation, if the liftgate 5" encounters an obstacle, the motor 11" can simply be stopped or reversed, changing the direction of motion of the liftgate 5".

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

What is claimed is:

1. An actuating device for moving a closure panel between an open position spaced apart from a vehicle body and a closed position abutting the vehicle body to close an access opening thereof, said actuating device comprising:

a telescopic arm including a first member coupled to one of the closure panel and the vehicle body and a second member coupled to the other of the closure panel and the vehicle body, said first and second members slidable relative to one another to move said actuating device between a retracted position corresponding to the closed position and an extended position corresponding to the open position;

a screw rotatable relative to said first member; a nut secured to said second member and threadingly engaging said screw such that rotation of said screw moves said second member towards and away from said first member to move said actuating device between said respective retracted and extended positions; and a gas spring disposed within said telescopic arm for urging said actuating device into said extended position to move the closure panel into the open position, said gas spring and screw spaced apart and generally parallel to one another within said telescopic arm.

2. An actuating device as set forth in claim 1 wherein one of said first and second members includes a first cylindrical enclosure receiving said screw therewithin.

3. An actuating device as set forth in claim 2 wherein said one of said first and second members includes a second cylindrical enclosure receiving said gas spring therewithin.

4. An actuating device as set forth in claim 3 wherein said first and second cylindrical enclosures are arranged in a parallel orientation.

5. An actuating device as set forth in claim 1 including a motor assembly operably coupled to said screw for rotating said screw in opposing first and second directions.

* * * * *